UNITED STATES PATENT OFFICE.

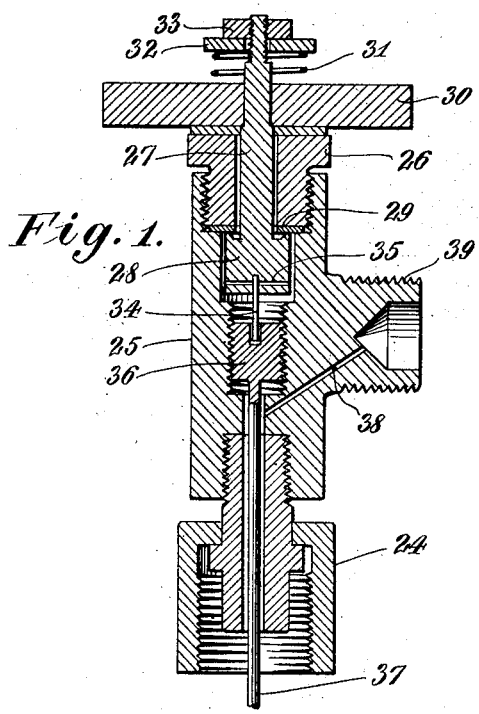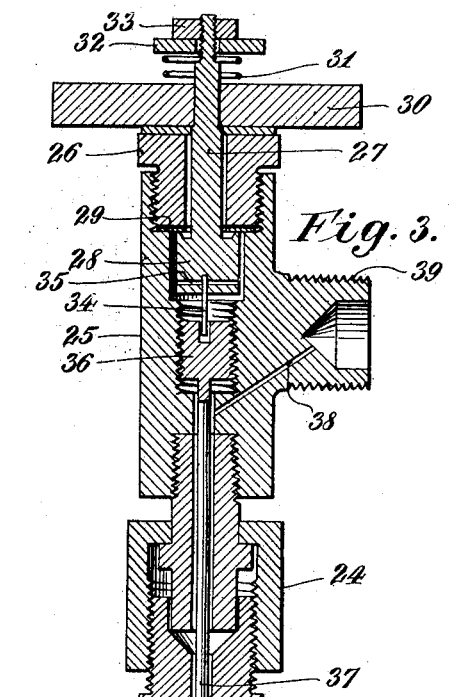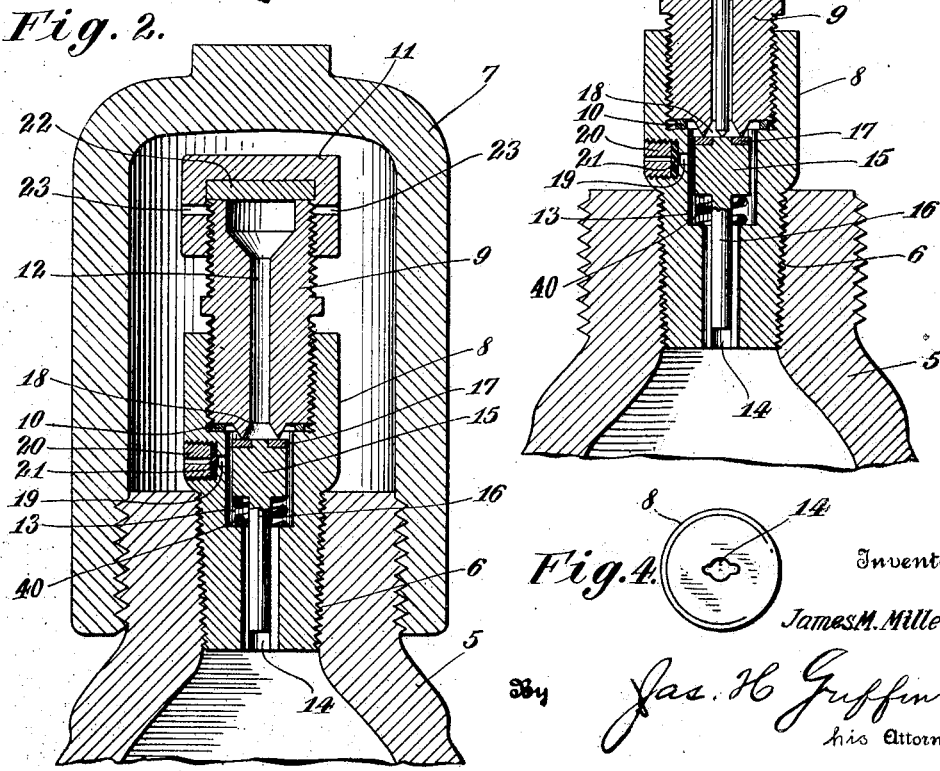

JAMES M. MILLER, OF JERSEY CITY, NEW JERSEY.

VALVE FOR CONTROLLING THE FLOW OF FLUIDS AND GASES UNDER PRESSURE.

1,374,860. Specification of Letters Patent. Patented Apr. 12, 1921.

Application filed November 13, 1919. Serial No. 337,673.

*To all whom it may concern:*

Be it known that I, JAMES M. MILLER, a citizen of the United States, residing in Jersey City, county of Hudson, and State of New Jersey, have invented a certain new and useful Valve for Controlling the Flow of Fluids and Gases Under Pressure, of which the following is a specification.

This invention is a valve for controlling the flow of fluids and gases under pressure and, while adapted for broad and general use, is particularly intended for employment with the well known elongated cylindrical tanks used in the commercial distribution of oxygen for acetylene welding, etc.

Oxygen tanks have long been used and the withdrawing of the oxygen from said tanks under high pressure is usually controlled by a valve which is screwed into a tapped hole in the top of the tank and is known to the trade as a "service valve." This valve is composed of numerous parts among which are a coupling by means of which a service pipe may be connected to the valve, and a hand wheel through the manipulation of which the flow of oxygen through the service pipe may be controlled. Service valves are expensive to manufacture and, because of the high pressure which they control, require delicate adjustment and the machining of practically all of the parts. Their manufacture and upkeep are a continual source of heavy expense. In companies employing many thousands of tanks, the overhead expense in maintenance and repair of the service valves, one of which is employed with each tank, amounts to many thousand dollars annually over and above the initial high cost of each valve.

As the tanks are shipped with service valves attached, precautionary measures are necessary to protect the valves from damage and, in practice, each tank is provided with a threaded cap which screws on to the outlet end of the tank and serves to house the valve. These caps are quite deep as the service valves are rather high and, when the tank is ready for shipment, the cap adds considerably to the length of the tank, requiring additional shipping and storing space.

With these, and other considerations in mind, the object of the present invention is to provide a valve arrangement which will obviate the necessity of associating a service valve with each individual pressure tank, and to so constitute the valvular control means of the tank, that the fluid or gas is normally retained therein under pressure by a valve of simple and compact construction and with which an improved form of service connection may be associated when it is desired to draw off the contents of the tank. By this construction, the novel form of service connection employed becomes, in effect, a master connection, so that only one service connection is required for each user and the necessity of duplication of a service connection for each individual tank is overcome.

A further advantage of this construction is that the valve may be made considerably smaller than the service connection and consequently require a much smaller housing cap, with the result that the tank is less bulky for shipping or storage. Moreover, the construction of the valve may be very simple so that its initial cost will be but a small fraction of the initial cost of the well known service valves and its upkeep or maintenance will be inconsequential from the standpoint of cost.

Features of the invention, other than those specified, will be apparent from the hereinafter detailed description taken in conjunction with the accompanying drawings.

In the accompanying drawings, I have illustrated one practical embodiment of the invention, but the construction therein shown is to be understood as illustrative only, and not as defining the limits of the invention.

Figure 1 is a central section of an improved form of service connection which I preferably employ.

Fig. 2 is a like section of the preferred form of valve used, said valve being shown as operatively associated with a pressure tank of the usual form and housed within a conventional cover cap ready for shipment.

Fig. 3 is a central section of the valvular means of this invention employed for use in the dispensation of gas or fluids under pressure; and, Fig. 4 is an end view of the inner end of the valve.

Referring to the drawings 5 designates the delivery end of a pressure tank of the type commonly employed for the distribution of oxygen, etc. This tank is provided with a threaded outlet opening 6, in which is adapted to be screwed a valve for controlling the dispensation of the contents of the tank. The exterior or neck of the tank 5 may be threaded to receive a screw cap 7 adapted to house the valve associated with the outlet opening thereof.

It has long been the practice to screw the threaded end of a service valve directly into the opening 6 and to house the same for transportation within the cap 7. However, in accordance with this invention, a valve is associated with the tank as shown in Fig. 2 while a service connection such as for example shown in Fig. 1 may be associated with the valve to control the operations of the latter. The valve may differ in details of construction from the preferred embodiment illustrated in Fig. 2, but, as shown, it consists of a valve casing formed in two sections 8 and 9 screwed together as shown, with a gasket 10 interposed between them to preclude leakage in the threaded joint. The lower end of the lower section is threaded to screw into the tank 5 and the upper end of the upper section is threaded to receive a screw cap 11 or a coupling, by means of which the service valve may be associated therewith. Said upper section 9 is also provided with a passage 12 leading longitudinally through the section and the lower section 8 is provided with a valve chamber 13 having communication through a passage 14 with the interior of the tank. Within the chamber 13 is positioned a sealing element 15 of the valve, which sealing element is provided with a stem 16 guided for movement in the passage 14.

In the construction illustrated the stem 16 is circular whereas the passage 14 is irregular in cross section as shown in Fig. 4 so as to allow of the drawing off of the fluid or gas through said passage and about the stem 16 when the sealing element is unseated. If desired, however, the passage 14 may be circular in cross section and the stem 16 squared or fluted.

The sealing element 15 carries a valve washer 17 of any suitable material adapted to engage with a knife-edge valve seat 18, formed at the lower end of the upper section 9 and said sealing member 15 is normally held to its seat, as shown in Fig. 2, by the pressure in the tank assisted by a spring 40. It will be noted that the valve chamber 13 is at all times in communication with the pressure in the tank and, since it is desirable in tanks for carrying high compressed fluids or gases to provide safety means for precluding its explosion, I preferably associate this safety means with the lower section 8 of the valve casing in such manner that it communicates with the valve chamber 13. While the safety means may be of different forms, that preferred is shown in Fig. 2. The wall of the valve chamber 13 is provided with an aperture 19 communicating with a tapped hole into which may be screwed an apertured plug 20. The plug 20 is screwed into the tapped hole in such manner as to force a fusible disk 21 into a position to normally seal both the aperture 19 and the aperture in the plug 20. However, in case of fire, the disk 21 fuses and allows of the escape of the pressure through the alined apertures of the plug and valve casing.

In order to preclude the escape of pressure from the tank during shipment or storage in such cases where the valve washer 17 of the sealing member or its seat becomes worn through excessive wear, the screw cap 11 is provided and this screw cap is threaded on to the upper portion of the upper section 9 over a washer or gasket 22 which forms a tight seal. It is, however, apparent that, if the sealing member 15 is in a leaky condition, the pressure in the tank will be communicated to the passage 12 of the upper section with the result that, when the screw cap 11 was removed to allow of the association of the service connection with the valve, this pressure would have a tendency to throw the screw cap 11 free as soon as the last thread was cleared, with consequent danger to the operator. Accordingly, I preferably use this screw cap with apertures 23 in the sides thereof, which apertures uncover to allow of the escape of pressure which may exist in the passage 12, after the cap 11 has been unscrewed but a portion of the required distance to release it, and the pressure simply blows out through the apertures 23 and by thus escaping overcomes the danger referred to.

The tank with the screw cap 11 in place and the housing screw cap 7 covering the same, is shipped or stored as shown in Fig. 2, but when it is desired to draw off the pressure for use in acetylene welding or otherwise, the housing cap 7 is first removed and thereafter the screw cap 11 taken off so as to allow the service connection shown in Fig. 1 to be associated with the valve. To this end, the service connection is provided with a coupling 24 of well known form, adapted to screw on to the upper portion of the valve, after the screw cap 11 is removed therefrom, and by this coupling the service connection and valve are operatively associated with one another after the manner shown in Fig. 3.

In its preferred embodiment, the service connection embodies a casing 25 cored out for its entire length. The lower end of the casing 25 carries the coupling 24 while the upper end of the casing is tapped to receive a screw plug 26. Through the screw plug 26 extends a stem 27 of a sealing member 28 adapted to seat against the gasket 29 clamped in place by the screw plug 26. The stem 27 extends above the top of the plug 26 and passes through a hand wheel 30 to which it is fixed against rotation. The spring 31 is coiled about the stem 27 above the hand wheel 30 and beneath the washer 32 backed up by a nut 33 screwed on to the upper end of the stem 27. Spring 31 serves to hold the sealing member 28 tightly to the gasket 29 for the purpose of precluding leakage about its stem. The sealing member 28 is slotted at its lower end to receive a rectangular plate 34 which is secured in place by a pin 35 and operates in the same manner as a screw driver upon a rotary member 36 threaded into the valve casing as shown. The rotary member 36 carries a depending rod 37 which extends considerably below the coupling 24 and is adapted, when the service connection is associated with the valve to project through the passage 12 of said valve into coöperative relation with the sealing member 15 of the latter as shown in Fig. 3. When the parts are associated as shown in this figure, rotation of the hand wheel 30 imparts rotation to the rotary member 36 which, because of its threaded coöperation with the valve casing partakes of a longitudinal movement carrying therewith the rod 37. If the longitudinal movement specified is in a downward direction the lower end of the rod 37 will engage with the sealing member 15 of the valve and force it clear of its seat thereby allowing the contents of the tank to pass through the valve and through a passage 38 of the service connection which leads to the interior of a threaded boss 39 adapted for the attachment of a service pipe through the employment of a suitable connection similar to the connection 24. When the desired amount of gas or fluid under pressure has been withdrawn retrograde rotation of the hand wheel 30 will bring about a retracting movement of the rod 37 for the purpose of allowing the sealing member 15 to again come to its seat and seal the tank.

In the accompanying drawings, as well as the foregoing description, the invention has been described in its preferred form as particularly applied to oxygen tanks. However, it will be understood that the structure as shown is susceptible to changes in detail of construction without departing from the spirit of the invention. For example, the valve stem 16 of the sealing member 15 may, instead of depending into the inlet duct 14 to be guided therein, extend upwardly from the top of the sealing member to be guided in the outlet passage 12. Other details of construction may be modified to adapt the invention to different environments and this invention is, therefore, to be understood as not limited to the specific construction described but as broadly novel as is commensurate with the appended claims.

Having thus fully described the invention what I claim as new and desire to secure by Letters Patent is:

1. Valvular means for controlling the dispensation of fluids or gases under pressure from a container, embodying a valve permanently associated with the container and provided with a sealing element, and a removable member for normally further sealing the valve, said removable member being provided with means for allowing of the escape of accumulated pressure between the sealing element and the removable member during the removal of the latter, in combination with a master service connection adapted to be associated with the valve after the removal of the removable member, said service connection being provided with means for unsealing the first sealing element to allow of the drawing off and delivery of the contents of the container.

2. Valvular means for controlling the dispensation of fluids or gases under pressure from a container, embodying a valve permanently associated with the container and provided with a valve chamber and inlet and outlet ducts leading to and from the valve chamber, a sealing element positioned within the valve chamber and adapted to normally seal the outlet duct, and removable means for further sealing the outlet duct, said removable means embodying means for allowing of the escape of pressure accumulated in the outlet duct through the leakage of the sealing element, during the removal of the removable means, in combination with a master service connection adapted to be coupled to the valve and providing means for operating the latter.

3. Valvular means for controlling the dispensation of fluids or gases under pressure from a container, embodying a valve permanently associated with the container and provided with a valve chamber and inlet and outlet ducts leading to and from the valve chamber, a sealing element positioned within the valve chamber and adapted to normally seal the outlet duct, and removable means for further sealing the outlet duct, said removable means embodying means for allowing of the escape of pressure accumulated in the outlet duct through leakage of the sealing element, during the removal of the removable means, in combination with a master service connection provided with an actuating rod, means for coupling the service connection to the valve to bring the actuating rod into coöperative relation with the sealing member of the valve, and means for thereafter manipulating the actuating rod to move the sealing member into or out of sealing position, whereby the drawing off and delivery of the contents of the container may be carried out.

4. Valvular means for controlling the dispensation of fluids or gases under pressure from a container embodying a valve permanently associated with the container and provided with a valve chamber and inlet and outlet ducts leading to and from the valve chamber, a knife edge valve seat associated with the valve chamber, a sealing member positioned within the valve chambed and adapted to be forced by the pressure within the container into engagement with the valve seat to seal the receptacle against the flow of fluid pressure therefrom, in combination with a master service connection, means for coupling the master service connection to the valve, said master service connection embodying means for forcing the seal member from its seat, against the pressure within the container, to allow of the outlet of the contents of the container through the master connection.

5. Valvular means for controlling the dispensation of fluids or gases under pressure from a container embodying a valve permanently associated with the container and provided with a sealing element adapted to be normally held to its seat by the pressure within the container, in combination with a master service connection adapted to be associated successively with a number of such containers from which the contents are to be drawn off and embodying an outlet passage adapted to be placed in communication with the interior of the container when the sealing element is unseated, a member threaded into the service connection and provided with a stem extending into the valve and engaging with the sealing member thereof, a manually rotatable member carried by the service connection and locked against rotation to the threaded member, whereby the rotation of said member effects longitudinal movement of said member which acts through the stem thereof to unseat the sealing element of the valve.

6. Valvular means for controlling the dispensation of fluids or gases under pressure from a container embodying a valve permanently associated with the container and provided with a sealing element adapted to be normally held to its seat by the pressure within the container, in combination with a service connection adapted to be associated successively with a number of containers, the contents of which are to be withdrawn, said service connection being provided with a draw off passage adapted to be placed in communication with the interior of the container, when the sealing element of the valve is unseated, a rod extending into engagement with the sealing element of the valve, a member threaded into the service connection and coöperating with said rod to impart longitudinal movement thereto, a manually operable post, rotatably associated with the service connection and locked to said member for the purpose of permitting threaded member to be rotated by the manually operable post, and means associated with the post for precluding leakage of pressure around the post.

In testimony whereof, I have signed my name to this specification.

JAMES M. MILLER.